United States Patent [19]
Watanabe et al.

[11] Patent Number: 5,754,756
[45] Date of Patent: May 19, 1998

[54] DISK ARRAY SYSTEM HAVING ADJUSTABLE PARITY GROUP SIZES BASED ON STORAGE UNIT CAPACITIES

[75] Inventors: Naoki Watanabe, Kokubunji; Hitoshi Kakuta, Tokyo; Yoshifumi Takamoto, Fuchu, all of Japan

[73] Assignee: Hitachi, Ltd., Tokyo, Japan

[21] Appl. No.: 610,152

[22] Filed: Feb. 29, 1996

[30] Foreign Application Priority Data

Mar. 13, 1995 [JP] Japan ................... 7-081946

[51] Int. Cl.⁶ ................................................. G06F 11/00
[52] U.S. Cl. ................. 395/182.04; 395/441; 395/497.01
[58] Field of Search ..................... 395/182.03, 182.04, 395/182.05, 441, 497.03, 497.01, 497.04, 497.02

[56] References Cited

U.S. PATENT DOCUMENTS

| | | | |
|---|---|---|---|
| 5,263,145 | 11/1993 | Brady et al. | 395/441 |
| 5,278,838 | 1/1994 | Ng et al. | 395/182.04 |
| 5,423,046 | 6/1995 | Nunnelley et al. | 395/441 |
| 5,442,765 | 8/1995 | Shiga | 395/444 |
| 5,491,810 | 2/1996 | Allen | 395/444 |
| 5,517,632 | 5/1996 | Matsumoto et al. | 395/441 |
| 5,519,844 | 5/1996 | Stallmo | 395/441 |
| 5,537,567 | 7/1996 | Galbraith et al. | 395/441 |
| 5,546,535 | 8/1996 | Stallmo et al. | 395/183.18 |
| 5,546,558 | 8/1996 | Jacobson et al. | 395/441 |
| 5,568,629 | 10/1996 | Gentry et al. | 395/441 |
| 5,572,661 | 11/1996 | Jacobson | 395/182.05 |

OTHER PUBLICATIONS

D. Patterson et al, A Case for Redundant Arrays of Inexpensive Disks (RAID), in ACM SIGMOD Conference, Chicago, IL, Jun. 1988.

"Disk Array Controller Software Release 3.XX Manual" ADP-92-XX of NCR Corporation, Fig. 7-11.

"Mixed Drive Capacities and Vendors", DAC960 of Mylex Corporation.

*Primary Examiner*—Robert W. Beausoliel, Jr.
*Assistant Examiner*—Joseph E. Palys
*Attorney, Agent, or Firm*—Fay, Sharpe, Beall, Fagan, Minnich & McKee

[57] ABSTRACT

The capacity efficiency of a disk array, when this disk array is constructed of drives of different capacities, is managed with a table so that areas of larger capacity disk drives of the disk array that would otherwise be left unused can be used for parity group storage. In this regard, at least one parity group can be constructed of a size based on the disk drive unit of the array having the least capacity. And, at least one other parity group can be formed of the remaining area in the disk drive units having a capacity that is greater than the disk drive unit having the least capacity that is of a size based on the remaining area of the disk drive unit having the next least capacity of the disk array.

20 Claims, 6 Drawing Sheets

| LOGICAL VOLUME NO. | DATA NAME | CACHE ADDRESS | D-DRIVE NO. | FAILURE FLAG | P-DRIVE NO. | IN-SCSI ADDR. |
|---|---|---|---|---|---|---|
| LV#1 | #1 |  | #1 | 0 | #5 | DADR1 |
|  | #2 | CADR3 | #2 | 0 |  |  |
|  | #3 |  | #3 | 0 |  |  |
|  | #4 |  | #4 | 1 |  |  |
|  | #5 | CADR1 | #1 | 1 | #4 | DADR2 |
|  | #6 |  | #2 | 1 |  |  |
|  | #7 |  | #3 | 1 |  |  |
|  | #8 |  | #5 | 1 |  |  |
| LV#2 | #9 |  | #1 | 0 | #2 | DADR3 |
|  | #10 | CADR2 | #4 | 1 |  |  |
|  | #11 |  | #5 | 0 |  |  |
|  | #12 | CADR4 | #1 | 0 |  | DADR4 |
|  | #13 |  | #4 | 1 |  |  |
|  | #14 |  | #5 | 0 |  |  |
|  | #15 |  | #1 | 0 | #5 | DADR5 |
|  | #16 | CADR6 |  | 0 |  | DADR6 |
|  | #17 |  |  | 0 |  | DADR7 |
| LV#3 | #18 |  | #1 | 0 |  | DADR8 |
|  | #19 | CADR5 |  | 0 |  | DADR9 |
| ADDRESS TRANSLATION TABLE ||||||||

FIG. 4

| DRIVE NO. | MBYTE | PG#1 | PG#2 | PG#3 | PG#4 |
|---|---|---|---|---|---|
| #1 | CDRV1 | 1 | 1 | 1 | 1 |
| #2 | CDRV2 | 1 | 1 | 0 | 0 |
| #3 | CDRV3 | 1 | 0 | 0 | 0 |
| #4 | CDRV4 | 1 | 1 | 0 | 0 |
| #5 | CDRV5 | 1 | 1 | 1 | 0 |
| DRIVE NO. | | 5 | 4 | 2 | 1 |
| IN-DRIVE OFFSET | | PGOFF1 | PGOFF2 | PGOFF3 | PGOFF4 |
| RAID LEVEL | | 5 | 3 | 1 | |
| RAID COMPONENT | | 4D+1P | 3D+1P | | |
| CAPACITY | | CLV1 | CLV2 | CLV3 | CLV4 |
| LOGICAL VOLUME | | LV#1 | LV#2 | | LV#3 |
| RELIABILITY | | 3 | 2 | 1 | 4 |
| TRANSFER RATE | | 1 | 2 | 3 | 4 |

LOGICAL GROUP COMPONENT TABLE

DISK ARRAY SYSTEM HAVING ADJUSTABLE PARITY GROUP SIZES BASED ON STORAGE UNIT CAPACITIES

BACKGROUND OF THE INVENTION

The present invention relates to a disk array system for high performance input/output operations.

In the existing computer system, the data demanded from the host side CPU are stored in the secondary storage unit so that they are written in or read out. This secondary storage unit is generally nonvolatile, as represented by a magnetic disk unit or an optical disk ("drive").

In accordance with the high computerization of recent years, the computer system is demanded to have a high performance in the secondary storage unit. One solution is a disk array constructed of a number of drives having relatively small capacities.

In "D. Patterson, G. Gibson and R. H. Kartz: A Case for Redundant Arrays of Inexpensive Disks (RAID), in ACM SIGMOD Conference, Chicago, Ill., (June 1988)", the results of investigations of performances and reliability's have been reported operating at different levels, such as disk arrays at level 1 for duplexing data, at level 3 for dividing the data to process in parallel, and at levels 4 and 5 for decentralizing and handling the data. The system, as disclosed in this report, is thought at present to be the most general disk array.

In the disk array at level 3, one data given from the host is divided and stored (usually bit by bit or byte by byte) in a plurality of drives. In case the data are to be read out, their divided segments are collected from the drives and combined until they are transferred to the host. At level 3, therefore, parallel processing can be executed at the drives to improve the transfer rates.

In the disk array at levels 4 and 5, the individual data are not divided but handled independently of one another so that they are decentralized and stored in a number of drives having relatively small capacities. The parity is stored at the level 4 in the parity drive and is decentralized and stored at the level 5 in the drives. At levels 4 and 5, the I/O can be processed in parallel to improve the random access performance.

In the secondary storage unit of the general-purpose large-scale computer system being generally used at present, because of a large capacity per drive, the drive is used for another reading/writing demand. Thus, frequently there is a wait for the use of the drive. In the disk array at level 5 (or 4), a when used drive of large capacity, as used in the secondary storage unit of the general-purpose large-scale computer system, is constructed of a number of drives of relatively small capacities, in which the data are decentralized and stored. As a result, the reading/writing demands can be decentralized and processed, even increased, by the drives of the disk array so that the wait for the demands is reduced.

In the disk array, a large capacity drive of the prior art is constructed of a number of drives having relatively small capacities so that the number of parts is increased to raise the probability of failures. As a result, the parity is prepared in the disk array. The parity is made by taking an exclusive OR of each data bit of the drives constructing the disk array. The parity is stored in a drive other than those which store the data records from which the parity is generated.

The set of the physical drives constructing the disk array will be called the "logical group". Moreover, the set of the drives, which can be restored in case a certain drive fails in the logical group, will be called the "parity group". The set of one or more parity groups will be called the "logical volume", and the CPU accesses by deeming the logical volume as a virtual drive.

In case an arbitrary one of the drives composing the logical group fails, the individual data in the failure drive can be restored by taking an exclusive OR between the data in a normal drive and the parity for each group, to which the data belong.

On pp. 7 to 11 of "Disk Array Controller Software Release 3.XX Manual" of "ADP-92-XX (under the Trade Name) of NCR Corporation, it has been specified that the individual magnetic disk drives composing the disk array have to be constructed to have equal capacities. At present, there are a variety of suitable drives for forming a disk array, including a magnetic disk unit, and the trends toward obtaining increases in the capacity of the drives and the reduction of the costs are remarkable. Therefore, when drives are to be added to an older system, it is seriously uneconomical that all of the drives have to be of equal capacities.

In the catalogue "Mixed Drive Capacities and Vendors" of DAC960 (under the Trade Name) of MYLEX Corporation, it is permitted to form the disk array from drives of different capacities. All of the drives composing the disk array are considered to have the same capacity as the one with the least capacity. Specifically, in the case of a drive of 400 Mbytes being mixed in with four drives, each of 500 Mbytes, the 500 Mbytes drives are handled as if they had only a 400 Mbytes capacity.

SUMMARY OF THE INVENTION

According to the prior art, the disk array can be constructed of drives of different capacities. In case the disk array is constructed of four drives of 500 Mbytes and one drive of 400 Mbytes, for example, the capacities of each of the drives is deemed to be 400 Mbytes. This makes it impossible to use a free area totaling 400 Mbytes among the larger capacity drives. That is, 100 Mbytes in each of the four 500 Mbytes drives cannot be used.

The present invention has an object to improve the capacity efficiency of a disk array constructed of drives of different capacities, by managing the free storage capacity of the drives with a table so that the storage areas left unused by the prior art techniques can be used.

In a disk array constructed of a plurality of storage units of different capacities, at least one parity group is constructed of a size limited by the storage unit that has the least capacity, and at least one other parity group is formed of a size depending on the remaining area.

A table stores information on the group construction, i.e. the reliability and the transfer rate of the RAID, to determine the data arrangement. For example, the data may be arranged sequentially from the parity group having a higher reliability. If any storage unit fails the data may be restored sequentially from the parity group having a lower reliability.

An arbitrary number of parity groups are handled as one logical volume. The host unit gives the logical volume and the address in the logical volume as the logical address to the disk array system, and the access is actually executed by determining the corresponding physical address at the side of the disk array system.

BRIEF DESCRIPTION OF THE DRAWINGS

Further objects, features and advantages of the present invention will become more clear from the following detailed description of a preferred embodiment, described with respect to the accompanying drawing:

FIG. 4 is a diagram showing a logical group component table;

DETAILED DESCRIPTION OF A PREFERRED EMBODIMENT

Figure 1:
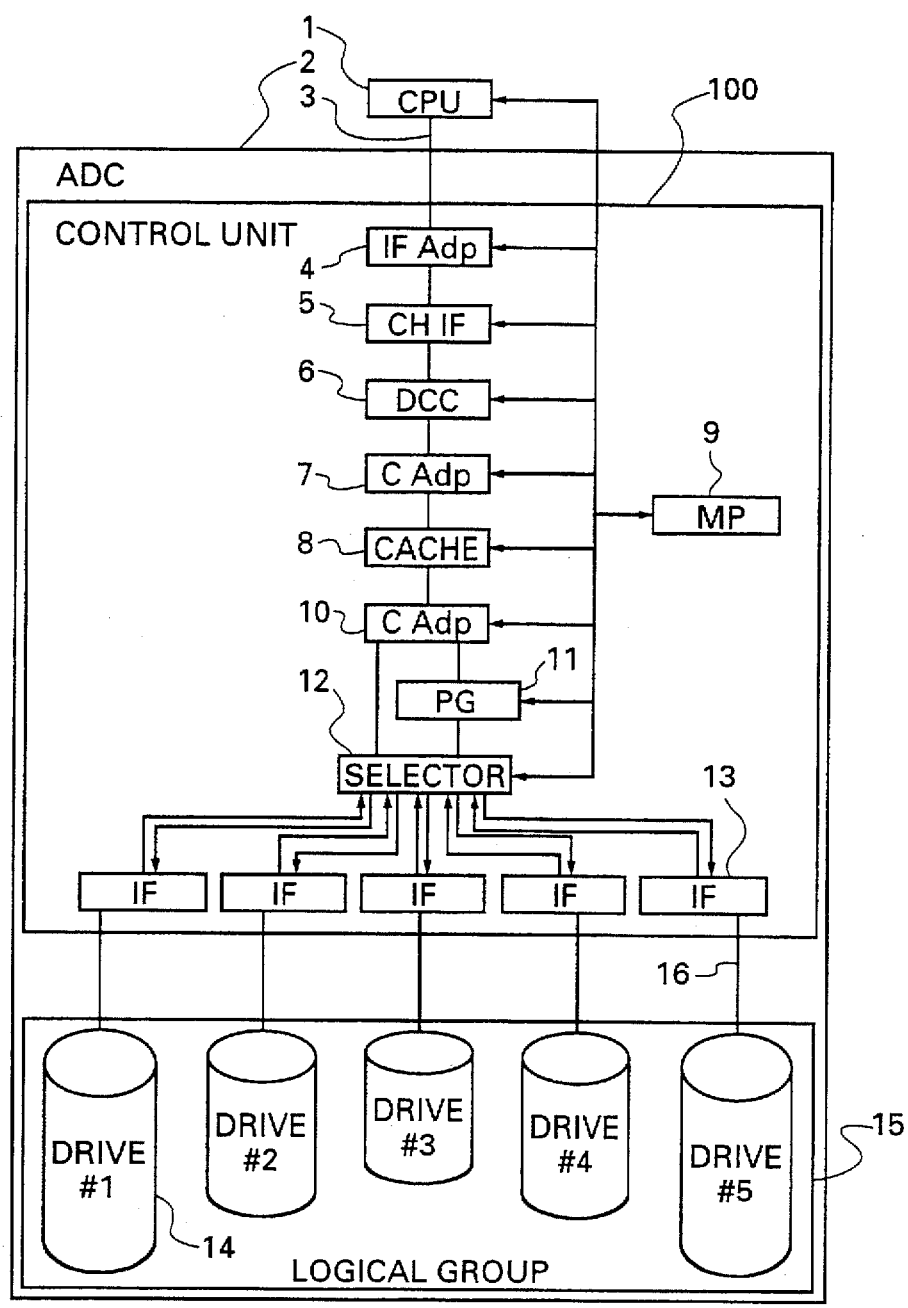
FIG. 1 is a diagram showing the entire construction of a disk array system of the embodiment.

In the present embodiment as shown in FIG. 1, a disk array controller ADC 2 is constructed of a control unit 100 and a logical group 15. A CPU 1 is a host unit for issuing read and write instructions to the ADC 2.

The logical group 15 is composed of a plurality of physical drives 14 (e.g., drive #1 to #5) and buses 16 for connecting the physical drives 14 individually with respective drive interface circuits (IF) 13. SCSI buses are generally used as the buses 16. The number of the physical drives 14 composing the logical group 15 is not especially limited to achieve the effects of the present invention.

Figure 2:
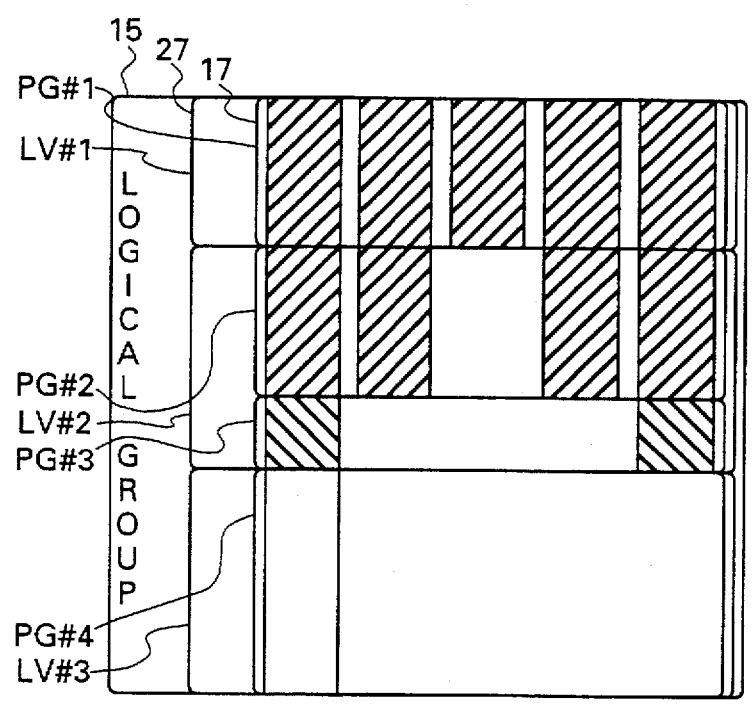
FIG. 2 is an explanatory diagram of a data division.

The physical drives of the logical group 15 are divided into four parity groups 17, i.e. PG#1, PG#2, PG#3 and PG#4 as shown in FIG. 2. The physical drives 14, i.e., #1, #2, #3, #4 and #5 have storage capacities of Cdrv1, Cdrv2, Cdrv3, Cdrv4 and Cdrv5, respectively, and Cdrv3<Cdrv2=Cdrv4<Cdrv5<Cdrv1. The parity group PG#1 is formed of the predetermined storage capacity areas of the physical drives #1 to #5. The parity group PG#2 is formed of the predetermined storage capacities areas of the drives #1, #2, #4 and #5. The parity group PG#3 is formed of the predetermined areas of the drives #1 and #5. The parity group PG#4 is formed of the predetermined area of the drive #1.

The storage capacities of the individual parity groups PG#1 to PG#4 are dependent upon the least capacity of the physical drives 14. For example, the parity group PG#1 is dependent on the capacity Cdrv3 of the drive #3 (the drive of smallest capacity) and is formed of the areas of the individual drives #1 to #5 having the capacity Cdrv3. In case the parity group PG#1 has a RAID component of (4D+1P), the effective capacity of the parity group PG#1 is Cdrv3×(5−1).

The parity group PG#2 is constructed with reference to the next least remaining capacity of the remaining drives #1, #2, #4, #5, which capacity (Cdrv2=Cdrv4) is of the drive #2 or the drive #4 and is formed of the area having the capacity of (Cdrv2−Cdrv3) of the drives #1, #2, #4 and #5.

The parity group PG#3 is constructed with reference to the physical drive #5 (the drive with the least remaining capacity) and is formed of the area having a capacity of (Cdrv5−Cdrv2). In case the parity group PG#3 is constructed to have the RAID level 1 (or the mirrored disk), its effective area is (Cdrv5−Cdrv2)×(2−1).

Thus, the actually usable capacity is dependent upon the RAID component of each parity group 17. Moreover, the RAID component of each parity group 17 can be freely made and takes a unit drive or a drive RAID0 to RAID5 in dependence upon the number of the drives 14 composing it. Each parity group 17 is composed of all or a portion of one to five physical drives 14 and may take an independent construction. For example, a parity group 17 can be constructed into a unit drive, if composed of one, into the RAID0 or the RAID1 if composed of two, and into the RAID0 to the RAID5 if composed of three or more.

In the case of FIG. 2: the parity group PG#1 has a component of the RAID5; the parity group PG#2 has a component of the RAID3; the parity group PG#3 has a component of the RAID1; and the parity group PG#4 has a construction of the unit drive. The parity group 17 is a recovery unit of the drive failure. When a failure occurs in any physical drive 14 contained in a parity group 17, the data of the failed drive 14 can be reconstructed from the data of the remaining normal drives 14 if the parity group 17 has the components of the RAID1 to the RAID5.

One or more parity groups 17 are collected into one logical volume. The logical volume is recognized as the access unit volume by the CPU 1. The logical group 15 is set with three logical volumes LV#1, LV#2 and LV#3, as shown in FIG. 2. The logical address designated by the CPU 1 at the access time includes the logical volume number (ID) and the data name. The ADC 2 translates the logical volume number and the data name, as given from the CPU 1, to the physical address by using an address translation table 37 of FIG. 3.

In the case of a logical volume LV#1–LV#3 that is composed of a plurality of parity groups 17, the data written in the logical volume is assigned to any one of the parity groups 17. This assignment of data to the parity groups 17 is determined by using the reliability and the transfer rate difference between the parity groups 17.

First will be described the relation of the reliability of each parity group 17. In FIG. 2, the data of the individual parity groups PG#1; any two of the four drives #1, #2, #4 and #5 fail in the parity group PG#2; both the two drives #1 and #5 fail in the parity group PG#3; or the single drive #1 fails in the parity group PG#4. Hence, the reliabilities R of the individual parity groups 17 have the following relations:

RPG#3>RPG#2>RPG#1>RPG#4.

From these relations is determined a reliability R29 of the logical group component table 18 of FIG. 4. The reliability values are specified such that PG#3=1, PG#2=2, PG#1=3, and PG#4=4 (wherein the reliability is the higher for the smaller value). The most significant data, as determined by the user, are stored in the parity group PG#3 having the higher reliability, whereas the least significant data are stored in the parity group PG#4 having the lower reliability. This control is executed by the MP 9 with reference to table 18. The significance of the data may be given with the data from the host CPU 1 or decided by the MP 9.

In case the MP 9 or CPU 1 is ignorant of the significance of the data, the MP 9 decides the arrangement of data in the following manner. Specifically, in case the logical volume has a sufficient margin, the data are arranged in the parity group 17 having a higher reliability and are arranged in the parity group 17 having the lower reliability as the left capacity of the logical volume becomes the less.

The transfer rate is simply determined by the number of drives composing the parity group 17: PG#1>PG#2>PG#3 >PG#4. These relations determined the transfer rate 30 of logical group component table 18. The values of the transfer rate are specified such that PG#1=1, PG#2=2, PG#3=3, and PG#4=4 (wherein the transfer rate is the higher for the smaller value).

If the table is thus set with the values indicating the transfer rates of the individual parity groups, the control is made such that files having larger volume are stored in the parity group having the higher transfer rate whereas files having smaller volume are stored in the parity group having the lower transfer rate, which control is executed by the MP 9.

In the case of a write to logical volume LV#2 composed of the two parity groups PG#2 and PG#3, the CPU 1 gives both new write data and the significance of the data, upon which the MP 9 stores the more significant data in the parity group PG#3 having the higher reliability and the less significant data in the parity group PG#2 having the lower reliability. Without this designation of significance by the CPU 1, the data are arranged at first in the parity group PG#2 until PG#2 is full and then arranged in the parity group PG#3.

Figure 3:
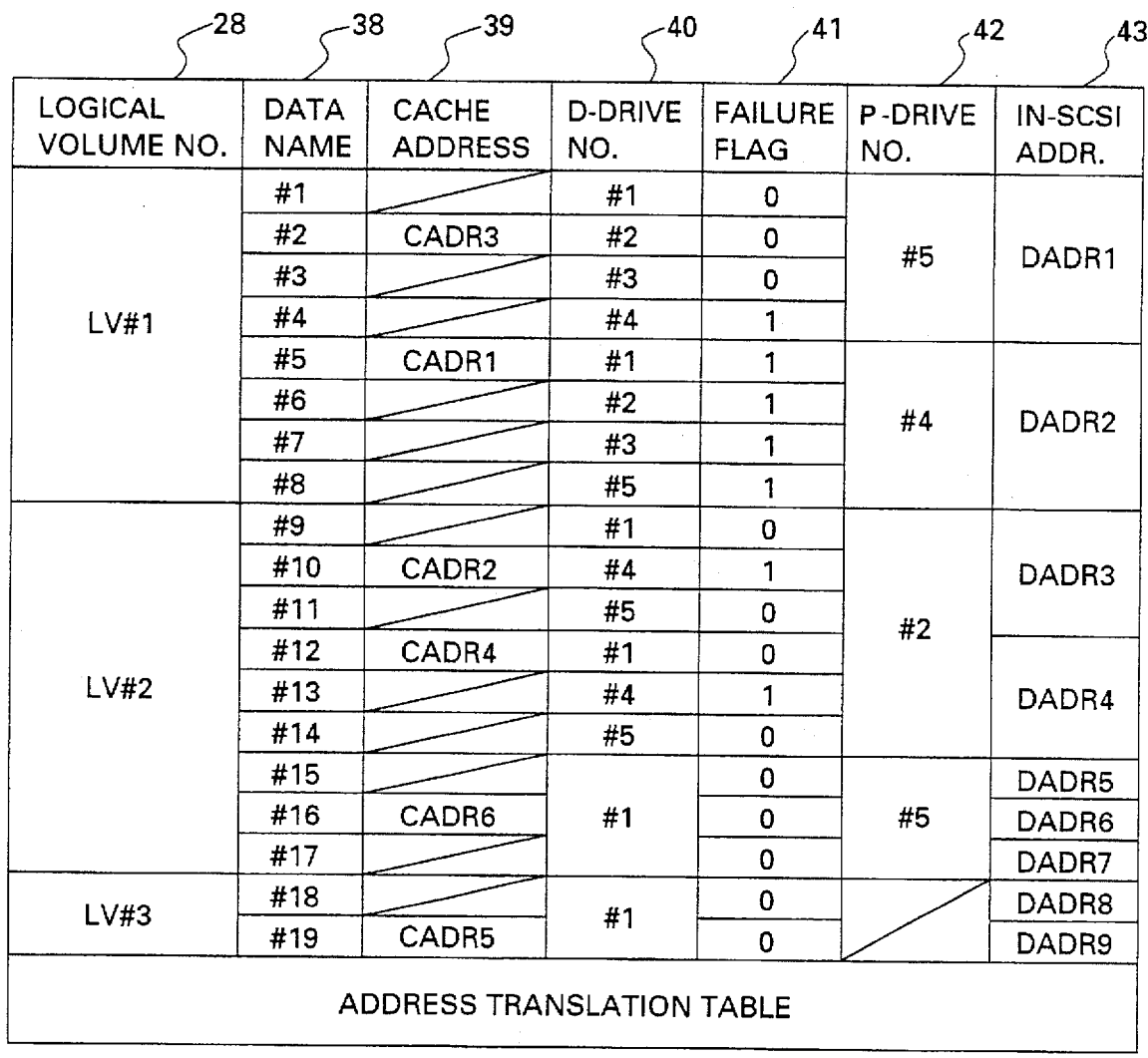
FIG. 3 is a diagram showing an address translation table.

In FIG. 1, a command, as issued by the CPU 1, is inputted through an external interface bus 3 to an interface adapter (IF Adp) 4 of the ADC 2. This IF Adp 4 decides whether or not it is possible to accept the command issued from the CPU 1. The micro processor MP 9 accepts the command if the command can be processed, and otherwise sends a response of unacceptability to the CPU 1. After acceptance of the command the reading or writing process is started. The logical group component table 18 and an address translation table 37 of FIG. 3 are initialized.

The address translation table 37 translates a designated address (i.e., the logical volume number and the data name) into the physical address of the drive 14 when the CPU 1 issues a read or write demand. In FIG. 4 the logical group component table 18 stores the parity group of each drive 14, and stores the drive number, the in-drive offset, the RAID level and the RAID component for each parity group. The logical group component table 18 of FIG. 4 and the address translation table 37 of FIG. 3 are stored in a cache memory 8, as shown in FIG. 1. These tables 18, 37 are automatically read in to the cache memory 8 by the MP 9 from one or more designated drives 14 independently of the CPU 1 when the power of the system is turned ON. When the power is turned OFF, on the other hand, the address translation table 37 in the cache memory 8 is automatically stored by the MP 9 in a predetermined place of the read designated drive 14 independently of the CPU 1. The address translation table 37 of FIG. 3 is set by using the logical group component table 18 of FIG. 4.

Figure 5:
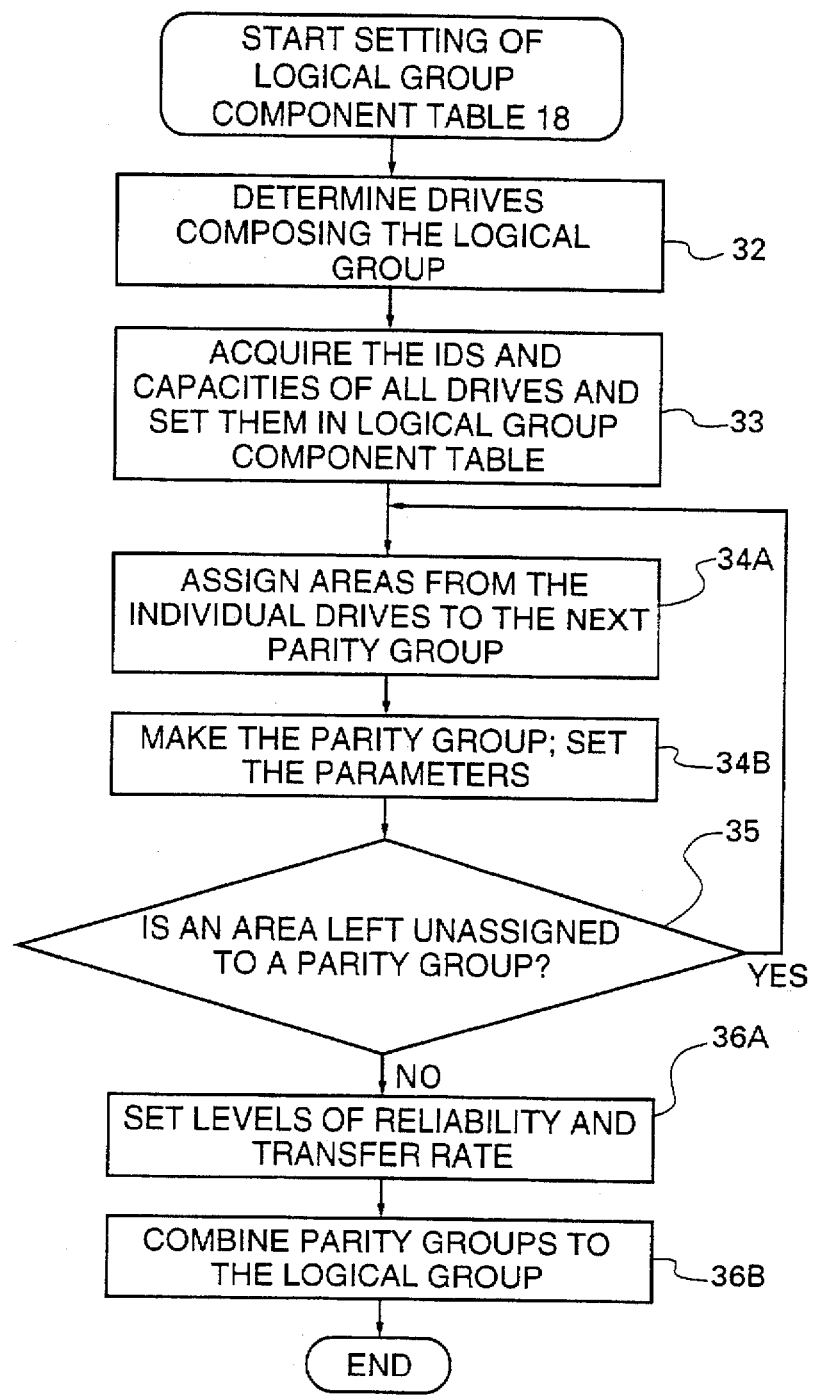
FIG. 5 is a flow chart showing a procedure for setting the logical group component table.

FIG. 5 is a processing flow chart for the MP 9 to initialize the logical group component table 18. The system manager determines the drives 14 composing the logical group 15 (Step 32). The drives composing the logical group 15 may be automatically set by the MP 9. Next, the MP 9 acquires the drive numbers and capacities of all the drives composing the logical group 15, and sets them in a drive number field 19 and a capacity field 20 (specific capacities are not specified) of the logical group component table 18 of FIG. 4 (Step 33).

Next, the MP 9 determines the individual parity groups 17. Specifically, the areas are assigned from the individual drives to the drive having the least space (at Step 34A), to make the parity group by the assigned areas, and the parameters of the parity group are set in the logical group component table 18 of FIG. 4 (at Step 34B). Then, these steps are repeated till the area having failed to be assigned to the parity group disappears (at Step 35). These Steps 34A, 34B and 35 will be described hereinafter in more detail.

Step 34A: The drive having the least capacity is determined from table 18. In this embodiment, the capacity 20 of drive #3 (Cdrv3) is the least, although its capacity is not specified in the table. As a result, the first parity group PG#1 is generated in conformity to the capacity Cdrv3 of the drive #3 areas having the same capacity as (Cdrv3) are assigned from the individual drives #1 to #5 to the parity group PG#1 and the MP 9 sets a flag 31, of FIG. 4.

The flag 31 indicates the drives composing the parity groups. Specifically, a flag 31 corresponding to a certain parity group and a certain drive set at "1", indicates that the drive is one of the drives composing that parity group. When the flag 31 is at "0", it is indicated that the drive does not belong to the drives composing that parity group. In this embodiment, the parity group PG#1 is composed of the drives #1 to #5 so that the content of the flag 31 corresponding to the drives #1 to #5 is set to "1".

Step 34B: The MP 9 sets the logical group component table 18 of FIG. 4 with the construction information, which includes a drive number 22, an in-drive offset value 23, a RAID level 24, a RAID component 25 and a capacity 26.

The MP 9 examines how many drives the parity group is composed of, calculated with reference to number of flags 31 that are set and sets the drive number 22 of the logical group component table 18. For example, it is seen from the flags 31 that the parity group PG#1 is composed of the five drives 14, so that the drive number 22 of the parity group PG#1 is 5. The MP 9 determines and sets in-drive offset 23, which indicates the leading address in with reference to the capacity 20 of each drive 14. The parity group PG#1 starts from the top of the drive 14 so that the in-drive offset Pgoff1 takes the value "0". In the case of the parity group PG#2, the capacity Cdrv3 used in the parity group PG#1 is the offset, so that the in-drive offset Pgoff2 is the capacity Cdrv3. On the basis of the information of the parity group 17 and the drives 14 composing the parity group 17, the system manager determines and designates the RAID level of each parity group 17. On the basis of the designations, the MP 9 sets the RAID level 24 of the logical group component table 18. In FIG. 4, the RAID level 24 of the PG#1 is 5, the RAID level 24 of the PG#2 is 3, the RAID level 24 of the PG#3 is 1, and PG#4 composed of only one drive 14 is not set with the RAID level 24. The setting of the RAID level 24 may be by the system manager or automatically by the MP 9. For example, the MP 9 can automatically set the parity group composed of three or more drives to the RAID3, RAID4 or RAID5, the parity group composed of two drives to the RAID1, and the parity group composed of one drive to the RAID0. The RAID component 25 is the component of the AID constructing the parity group 17. With reference to the RAID level 24, the drive number 22 and each drive capacity 20 of the parity group 17, the system manager designates the construction of the RAID and the MP 9 sets the RAID component 25 on the basis of the designations. The setting of the RAID component 25 may be by the system manager or automatically by the MP 9. In this case, the RAID component is determined in advance for each RAID level, to set the RAID component 25 according to the RAID level 24 of the parity group.

The capacity 26 is a size of the data area of the parity group 17 and is set by the MP 9 with reference to the capacity 20 of each drive 14 and the RAID component 25. For example, the parity group PG#1 is prepared according to the capacity (i.e., Cdrv3) of the drive #3 or the drive having the least capacity 20 so that it has a construction of (4D+1P) (RAID5). In this case, the value of C1v1 set as the capacity 26 is (5−1)×Cdrv3.

The decision of Step 35 is executed after the information of one parity group has been set in the logical group component table 18 by Steps 34A and 34B. Step 35 decides whether there us an area not assigned to the parity group 17. If an unassigned area is left, the routine is returned to Step 34A, so that similar operations are repeated for the remaining areas to form further parity groups. For example, after the parity group PG#1 has been set, unassigned areas are still left in the drives #1, #2, #4 and #5. Of the drives #1, #2, #4 and #5, the smallest unassigned areas are in the drives #2 and #4, and the parity group PG#2 is set to include drives #2 and #4 by Steps 34A and 34B. The steps 34A and 34B are repeated until all the areas are assigned to parity groups disappear.

The repetition of steps 34A and 34B need not be continued until the disappearance of unassigned areas, but the parity groups 17 can be set for an arbitrary area which has been divided with reference to the smallest drive 14. In FIG. 3, for example, after the parity groups PG#1 and PG#2 have been set, the unassigned areas are left in the drives #1 and #5. There are generated the parity groups PG#3 and PG#4, whose unassigned areas can be easily handled as the set of unit drives.

The levels of a relative reliability 29 and a transfer rate 30 between the parity groups 17 are set (at Step 36A), as has already been described with reference to FIG. 2, if the reliability 29 is given the mirror construction for the two drives 14 composing the parity group 17 and the RAID component of (n−1)D+1P for n (n>3), it may be sequentially set with the levels of the following relations:

Two Components>Three Components> --- m Components>Single Component (m: the total drive number of the logical group 15) the transfer rate may be sequentially set with the higher levels from the parity group having the larger number of components.

Next, the system manager combines the parity groups 17 to determine the logical volume 27 and sets a logical volume number 28 in the logical group component table 18 of FIG. 4 (Step 36B). Since the parity group PG#1 constructs the logical volume LV#1 in FIG. 2, its logical volume number 28 takes the value LV#1. Likewise, the parity groups PG#2 and PG#3 construct the logical volume LV#2, their logical volume number 28 is set to the value LV#2. Likewise, the parity group PG#4 has its logical volume number 28 set to the value LV#3.

After the logical group component table 18 of FIG. 4 has been initialized as described above, it is restored to set the address translation table 37 for each logical volume 27 in the logical group 15, as shown in FIG. 3.

In FIG. 3, the logical volume number 28 is a field storing the number of the logical volume 27. The logical volume number 28 is initialized with the logical volume number 28 which has been set in the logical group component table 18 of FIG. 4. The data name 38 is a field storing the logical address in the logical volume 27, and initialization to no data name 38 implies that the corresponding area is free of data. The cache address 39 is a field storing the address in the corresponding cache memory 8 in case the data of the data name 38 is present in the cache memory 8. The failure flag 41 is initialized with "0", to show "no failure" in the drive 14 storing the data of the data name 38, and set with "1" if the drive 14 fails. The D-drive number 40 is a field storing the numbers of the drives 14, in which are stored the data of the data name 38. The P-drive number 42 is a field storing the numbers of the drives 14, in which are stored the parity information (parity bits or blocks) corresponding to the data of the data name 38. If the drive of the P-drive number 42 fails, all the failure flags 41 corresponding to the data used for generating the parity blocks are set to "1". In FIG. 3, for example, the data #5, #6, #7 and #8 are stored in the drives #1, #2, #3 and #5, respectively, and the parity information generated from those data are stored in the drive #4. However, all the failure flags of the data #5, #6, #7 and #8 are set to "1", when the drive #4 has failed. The in-SCSI address 43 is a field storing the physical address in the SCSI of the drive 14, in which are stored the data of the data name 38 and the parity information relating to the data. Specifically, the in-SCSI address 43 is composed of a cylinder address indicating the number of the drive and the cylinder number in the drive 14, a head address indicating the number of the head for selecting the track in the cylinder, and a record address indicating the position of the record in the track. The D-drive number 40, the P-drive number 42 and the in-SCSI address 43 are initialized with the in-drive offset 23, the RAID level 24, the RAID component 25 and the capacity 26 of the parity group constructing the logical volume. For example, the parity group PG#1 of the logical volume number LV#1 has the RAID level 24 at 5, the RAID component 25 at (4D+1P), the in-drive offset 23 at Pgoff1 (=0), and the capacity 26 at C1c1=(5−1)×Cdrv3, Therefore, the in-SCSI address for the capacity 26 of C1v1 is retained from the Pgoff1 so that the address is wholly set. According to the RAID level and the RAID component, moreover, the D-drive number 40 and the P-drive number 42 are set.

Figure 6:
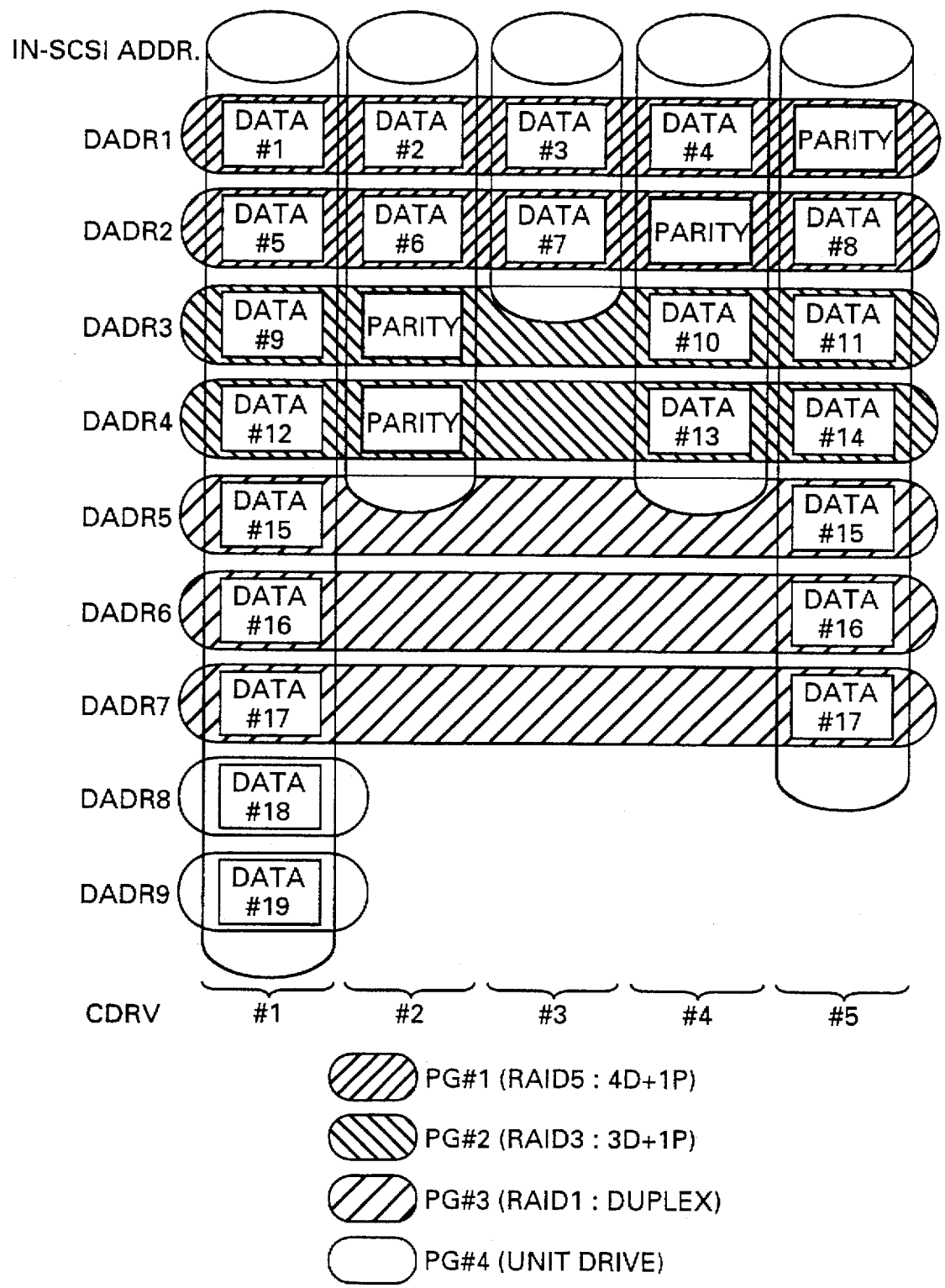
FIG. 6 is an explanatory diagram showing the storage behavior of data in the disk array system.

In each of the drives 14 composing the logical group 15, the data forming the parity information and the parity formed of the data are stored in the common in-SCSI address 43. FIG. 6 schematically shows storing the data according to the address translation table 37 of FIG. 3. The data #1, #2, #3 and #4, respectively, in which the in-SCSI address 43 is at DADR1, and that the parity information generated from those data are stored in the drive #5 in the position wherein the in-SCSI address 43 is at the DADR1 as a variation, the data for generating the parity information and the parity information may be stored in the different in-SCSI addresses 43 without any problem.

(Address Translation)

In response to the read or write demand and the logical address logical volume number 28 and the data name 38 from the CPU 1, the MP 9 of the ADC 2 determines, from the address translation table 37 of FIG. 3, the D-drive number 40 of the drive 14, in which the data are actually stored, the in-drive physical address (i.e., the in-SCSI address 43), the cache address 39 and the P-drive number 42, in which is stored the parity relating to the data.

In FIGS. 3 and 6, for example, in case an access demand is issued from the CPU 1 at the logical address having the logical volume number LV#1 and the data name #2, the MP 9 is informed from the address translation table 37 of the fact that the logical address corresponds to the drive #2 and the DADR1 of the in-SCSI address 43, to translate into the physical address. Since, at this time, the DADR3 is registered in the cache address 39 of the data #2 in the address translation table 37, it is found that the data #2 is present in the DADR3 in the cache memory 8. If unregistered in the cache address 39, the data are not present in the cache memory 8. Moreover, it is found from the address translation table 37 of FIG. 3 that the parity relating to the data #2 is stored in the position of the drive #5 of the parity drive number 42, in which the in-SCSI address 43 is the DADR1. Thus, the logical volume number 28 and the data name 38, as designated by the CPU 1, are translated into the physical address of the actually reading/writing drive 14, and the read or write demand is then issued to the data #2 of the drive #2.

The present embodiment has been described by exemplifying the reading/writing operations of the parity group 17 which is constructed to have the RAID level of 5. However, the present invention can be easily practiced at another RAID level.

In response to the command from the CPU 1, the ADC 2 of MP 9 examines whether or not the command can be processed, and returns a response of processable, if possible, to the CPU 1, is fetched through the IF Adp 4 to the ADC 2 and is decoded by the MP 9 to determine whether a read command or a write command.

After the reception of the response that the command can be processed by the CPU 1 and that the command is a write command, the write data is transferred to the ADC 2. At this time, the ADC 2, as instructed by the MP 9, establishes connection between the IF Adp 4 and the CPU 1, and then the data transfer from the CPU 1 is accepted. A channel interface circuit CH IF 5 is instructed by the MP 9 to subject data as transferred from the CPU 1, to a protocol translation. As a result, the data from the CPU 1 have their rate adjusted from the transfer rate to the processing rate in the ADC 2. Specifically, in case the channel interface between the CPU 1 and the ADC 2 is optical, the CH IF 5 translates the protocol of the optical interface to the protocol of an electric interface in the ADC 2.

After the end of the protocol translation and the rate control in the CH IF 5, the data are subjected to data transfer control by a data control circuit (DCC) 6 and are transferred to a cache adapter circuit (C Adp) 7 until they are stored in the cache memory 8 by the C Adp 7. This C Adp 7 controls reading and writing the data from and in to the cache memory 8 in response to the instruction of the MP 9 and for monitoring the status of the cache memory 8.

When the MP 9 recognizes that the write data are new data to be written for the first time, the MP 9 starts to register the data name of the logical volume number 28, in the address translation table 37. In case the data name 38 is not registered in the address translation table 37 of FIG. 3, the area of the in-SCSI address 43 in the drive 14 of the D-drive number 40, has no data stored. In this space area, data may not be written from the initialization, and data written before may be unnecessary and the data name 38 is deleted from the address translation table 37 by the MP 9. The parity is generated by deeming the areas having no data storage wholly as "0"'s and is stored in the same in-SCSI address 43 as the data in the drive 14 of the P-drive number 42, as specified in the address translation table 37.

In case new data are to be written, the MP 9 registers the new write data by recognizing the space area (i.e., the item in which the data name 38 is not registered) to be newly written with the data in the address translation table 37 and by registering the data name which is sent from the CPU 1 to the corresponding item of the address translation table 37. As a result, the area to write the new data is retained. When the write area in the drive 14 of the new write data is retained, the cache address 39 corresponding to the retained area in the address translation table 37 is registered with the address in the cache memory 8 which is stored with the new write data.

In case the logical volume number of the logical address sent from the CPU 1 is the LV#2, which is composed of the two parity groups PG#2 and PG#3, it is necessary to decide which parity group the new write data are to be assigned to. If the new write data and the significance of the data is sent from the CPU 1, the MP 9 decides on the basis of the significance which of the PG#3 having a high reliability 29 or the PG#2 having a low reliability 29 is to be assigned. Moreover, the data name 38 in the decided parity group PG#2 or PG#3 is registered. If the significance of the data is not sent from the CPU 1, the data are arranged at first in the parity group PG#2, and if there is no space in the parity group PG#2, the data are arranged in the parity group PG#3.

After the end of the aforementioned registration of the address translation table 37 by the MP 9, the parity information is updated by the new write data (of which the parity information before the updating will be called the "old parity information" whereas the updated parity information will be called the "new parity information") in the following manner, and the new write data and the new parity information is stored in the drive 14 of the logical group 15. It is assumed that each of the drives 14 composing the logical group 15 is stored with the data and the parity information, as shown in FIG. 6. First of all, the MP 9 refers to the address translation table 37 from the logical address (i.e., the logical volume number 28 and the data name 39) designated by the CPU 1, to recognize the in-SCSI address 43, which is the drive 14 (i.e., the D-drive number 40 and the P-drive number 42) stored with the data and the parity information, and the physical address in that drive 14.

In FIGS. 3 and 6, for example, the MP 9 is assumed to recognize that the data having the logical volume number LV#1 of the data #2 are to be newly written in the position of the drive 14 having the D-drive number 40 of the drive #2, in which the in-SCSI address 43 is the DADR1. In response to the data to be written in the position of the drive 14 having the D-drive number 40 of the drive #2, in which the in-SCSI address 43 is the DADR1, the MP 9 recognizes, from the address translation table 37, that the parity is to be stored in the position of the drive 14 having the P-drive number 42 of the drive #5, in which the in-SCSI address 43 is the DADR1. After the MP 9 has thus recognized the data to be newly written and the physical address which is written with the data and the parity, it starts the writing of the data for the drive 14 of the drive #2 and the updating of the parity for the drive 14 of the drive #5.

In the updating of the parity, the MP 9 instructs at first the drive IF 13 to issue an old parity reading demand to the drive 14. In accordance with the reading procedure of the SCSI, the drive IF 13 issues the reading command through the drive path 16 of the drive 14. When the reading command is issued from the drive IF 13, the drive 14 accesses the instructed in-SCSI address 43 for the seeking and the rotation awaiting. After this access, the drive 14 transfers the old parity to the drive IF 13 through the read drive path 16. In the drive IF 13, the transferred old parity is further transferred to a cache adapter circuit (C Adp) 10 at the side of the drive 14. In this C Adp 10, the old parity is stored in the cache memory 8. At this time, the C Adp 10 informs the MP 9 of the fact that the old parity is stored in the cache memory 8. After the old parity has thus been read out to the cache memory 8, the MP 9 instructs a parity generator (PG) 11 to take the exclusive OR between the newly written data stored in the cache memory 8 and the old parity thereby to generate an updated new parity. In response to this instruction, the PG 11 generates and stores the new parity in the cache memory 8. After the new parity has been stored in the cache memory 8, the MP 9 starts to write the newly written data (i.e., the data #2 having the data name 38 of the DADR1 of the logical volume 27 of the LV#1) in the position of the drive #2, in which the in-SCSI address 43 is the DADR1, and the new parity in the position of the drive #5, in which the in-SCSI is the DADR1.

First of all, the MP 9 instructs the drive IF 13 to issue a demand to writing the data and the new parity to be newly written in the drive 14. In the drive IF 13, in accordance with the SCSI writing procedure, the writing command is issued to the drive 14 through the drive path 16. In the drive 14 to which is issued the writing command from the drive IF 13, the instructed in-SCSI address 43 is accessed for the seeking and the rotation awaiting. After the end of the access in the drive 14, the cache adapter circuit (C Adp) 10 reads out the newly written data or the new parity from the cache memory 8 and transfers it to the drive IF 13. In this drive IF 13, the newly written data or the new parity thus transferred is further transferred through the drive path 16 to the drive 14 to write the newly written data or the new parity in the address of the drive 14. The C Adp 10 informs the MP 9 of the fact that the newly written data or the new parity has been stored in the drive 14.

Here will be described the updating case in which the data already written in the drive 14 are to be updated to new data.

In response to the command of the writing demand for updating the data from the CPU 1, the MP 9 refers to the address translation table 37 by using the logical address (i.e., the logical volume number 28 and the data name 38) designated by the CPU 1, to recognize the D-drive number 40 and the P-drive number 42, which are stored with the data and the parity information, the in-SCSI address 43 or the physical address in the drives 14, and the failure flag 41. If the failure flag 41 in the address translation table 37 for the drive 14 stored with the data or the parity information is OFF (i.e., at "0"), the MP 9 recognizes that those drives 14 are normal, to perform the following updating.

The new data to be updated are stored from the CPU 1 in the cache memory 8 like the newly written data at the time of writing the new data. In the status shown in FIGS. 3 and 6, for example, it is assumed that the writing demand for the updating is issued from the CPU 1 for the data #2 of the drive #2, in which the in-SCSI address 43 is the DADR1. The MP 9 recognizes, from the address translation table 37, the D-drive number 40, the in-SCSI address 43 and the cache address 39 of the data to be updated (i.e., the old data), and the P-drive number 42 of the parity information to be updated (i.e., the old parity information). The MP 9 registers the cache address 39 of the address translation table 37 with the address in the cache memory 8 which is stored wit the newly written data. If the old data are not in the cache memory 8, the old data and the old parity are read out of the respective drives 14 and stored in the cache memory 8. If the old data are in the cache memory 8, only the old parity is read out from the drive 14 and stored in the cache memory 8. The method at this time for reading and storing the old data and the old parity in the cache memory 8 is identical to the method for reading out the old parity from the drive 14 to the cache memory 8 in the parity updating operation at the newly writing time, as described before. The old data and parity information thus read out and the new data to be written are subjected to an exclusive OR, as in the parity updating at the newly writing time described before, and the updated new parity information is generated and stored in the cache memory 8. When the parity updating is thus ended, the new data and the new parity information is stored in the in-SCSI address 43 of the drive 14, as in the parity updating at the aforementioned newly wiring time.

Here will be described the case in which the drive 14 stored with the old data to be updated fails when the data already written in the drive 14 are to be updated to new data.

In response to the command of the writing demand for updating the data from the CPU 1, the MP 9 refers to the address translation table 37 from the logical address (i.e., the logical volume number 28 and the data name 38) designated by the CPU 1, to recognize the D-drive number 40 and the P-drive number 42 of the drives 14, which are stored with the data and the parity information, the in-SCSI address 43 or the physical address in those drives 14, and the failure flag 41. If the failure flag 41 in the address translation table 37 for the drives 14 stored with the data is ON (i.e., at "1"), the MP 9 recognizes that the drives 14 are abnormal and performs the following updating.

The new data to be updated are stored from the CPU 1 in the cache memory 8 like the newly written data at the new data writing time. With the status shown in FIGS. 3 and 6, for example, it is assumed that the updating writing demand is issued from the CPU 1 to the data #4 of the drive #4, in which the in-SCSI address 43 is the DADR1. The MP 9 recognizes, from the address translation table 37, the D-drive number 40, the in-SCSI address 43 and the cache address 39 of the data to be updated (i.e., the old data), and the P-drive number 42 of the parity information to be updated (i.e., the old parity information). Since the failure flag 41 of the drive 14 of the drive #4, which is stored with the old data, in ON (1), the MP 9 recognizes, from the address translation table 37, that the drive #4 has failed, to start the writing operation for the failure. The MP 9 registers the cache address 39 of the address translation table 37 with the address which is stored with the newly written data in the cache memory 8. Next, the MP 9 recognizes, from the address translation table 37, the address of all the data and parity information concerning the recovery of the old data and parity information concerning the recovery of the old data in the parity group 17. Here, the MP 9 recognizes that the data #1, #2 and #3, i.e., the data for recovering the data #4 or the old data and the parity information are in the positions of the drives #1, #2, #3 and #5, in which the in-SCSI address 43 is the DADR1.

Next, the MP 9 reads out those data and parity information from the individual drives 14 recognized, and stores them in the cache memory 8. At this time, the MP 9 does not read out the data and parity information whose addresses are registered at the cache address 39 from the drives 14 by deciding that they are already present in the cache memory 8. The method for reading out data and parity information from the drives 14 and storing them in the cache memory 8 is identical to the normal reading from the drives 14 to the cache memory 8 in the parity updating operation at the new writing time, as described before.

Like the normal writing operation, as in the parity updating at the aforementioned newly writing time, an exclusive OR is taken between the data and parity information thus read out and the newly written data to generate the updated new parity information, which are then stored in the cache memory 8. After the parity updating operation has thus been ended, the parity information is updated by storing only the new parity information in the positions of the in-SCSI address 43 of the drives 14 by the method similar to the parity updating operation at the aforementioned newly writing time.

In case the drive stored with the parity information generated from the old data to be updated fails, the old data are updated to the newly written data, but the parity information is not stored. In the case of updating the data #5, as shown in FIG. 3, the drive #4 storing the parity information generated from the data #5 to #8 fails so that the MP 9 only updates the old data #5 to the newly written data but does not generate any parity.

In response to the data reading demand from the CPU 1, the MP 9 refers to the address translation table 37 using the logical address (i.e., the logical volume number 28 and the data name 38) designated by the CPU 1 to recognize the D-drive number 40, the in-SCSI address 43 and the failure flag 41. If the failure flag 41 is OFF (at 0), the MP 9 performs the following reading operation. The MP 9 examines the cache address 39 in the address translation table 37 to decide whether or not the data to e read out are present in the cache memory 8. In case the cache address 39 is registered with an address thus indicating the cache memory 8 stores therein the data to be read out (in the case of the cache hit), the MP 9 starts to read out the data from the cache memory 8. In the case of the cache miss, the MP 9 starts to read out the data from the drive 14.

In the cache hit case, the MP 9 translates the logical address (i.e., the logical volume number 28 and the data name 38) designated by the CPU 1, with reference to the address translation table 37, into the cache address 39 in the cache memory 8 and fetches the data from the cache memory 8. Specifically, under instruction of the MP 9, the data are read out from the cache memory 8 by the cache adapter circuit (C Adp) 7. The data, as read out from the C Adp 7, are transferred under the control of the data control circuit (DCC) 6 to the channel interface circuit (CH IF) 5. This CH IF 5 translates the data into the protocol of the channel interface in the CPU 1 and adjusts the rate to that corresponding to the channel interface. After the protocol translation and the rate adjustment in the CH IF 5, the data are transferred to the CPU 1 by the IF Adp 4.

In the cache miss case, the MP 9 recognizes, with reference to the address translation table 37, the D-drive number 40 of the drive 14, the in-SCSI address 43 or the physical address in the drive 14, and the failure flag 41. For the D-drive number 40 and the in-SCSI address 43, the MP 9 instructs the drive IF 13 to issue the reading demand to the drive 14. In the drive IF 13, the reading command is issued through the bus 16 in accordance with the reading procedure of the SCSI. In the drive 14, the instructed in-SCSI address 43 is accessed for the seeking and the rotation awaiting. After the end of the access in the drive 14, this drive 14 transfers the data through the bus 16 to the corresponding IF 13. In this drive IF 13, the transferred data is further transferred to the cache adapter circuit (C Adp) 10 at the side of the drive 14. In the C Adp 10, the data are stored in the cache memory 8. The C Adp 10 informs the MP 9 of the fact that the data are stored in the cache memory 8. On the basis of this information, the MP 9 registers the cache address 39 of the logical address (i.e., the logical volume number 28 and the data name 38) of the address translation table 37, to which the reading demand has been issued by the CPU 1, with the address in the cache memory 8 stored with the data. From now on, the data are transferred to the CPU 1 in accordance with the procedure similar to that of the cache hit.

Here will be described the case in which the data written in a failed drive 14 are to be read out.

In response to a data reading demand from the CPU 1, the MP 9 refers to the address translation table 37 using the logical address (i.e., the logical volume number 28 and the data name 38) designated by the CPU 1, to recognize the D-drive number 40 of the drive 14 stored with the data to be read out, the in-SCSI address 43 in the drive 14, and the failure flag 41. If the failure flag 41 is ON (at 1), the MP 9 recognizes that the drive 14 has failed, and executes the following reading operation.

First of all, the MP 9 examines the cache address 39 of the address translation table 37, to decide whether or not the data to be read out are in the cache memory 8. In the case of the cache hit, the MP 9 starts the control for reading out the data from the cache memory 8 as explained above when there was not failure. In the case of the cache miss, the MP 9 reads out data and parity information from the individual drives 14 recognized as not failed, to store such data in the cache memory 8. The MP 9 takes an exclusive OR between the data and parity information thus read out by the PG 11, to restore the data stored in the failed drive 14 and stores the restored data in the cache memory 8. The C Adp 10 informs the MP 9 of the fact that the data are stored in the cache memory 8. The MP 9 registers the cache address 39 for the logical address. The MP 9 transfers the data to the CPU 1 by a procedure similar to that of the cache hit.

When the drive that stores the parity information generated from the data to be read fails, the reading operation may be similar to the case of no failure. In the reading case for the data #5, as shown in FIG. 3, the MP 9 recognizes, from the address translation table 37, not only that the failure flag corresponding to the data #5 is at "1" but also that all the failure flags for the data #5 to #8 are at "1", and therefore the MP 9 determines that a failure has occurred in the drive #4 which stores the parity information generated from those data.

Here will be described a method of restoring the failure drive 14 once to a normal drive and then to the normal drive in which the data in the failure drive 14 are restored and replaced.

The MP 9 turns the failure flag 41 ON (to 1) for all the items of failed drive 14 on the address translation table 37, when it recognizes that a failure has occurred in the drive 14 in the logical group 15. If the drive #4 fails, for example, the MP 9 turns ON (to 1) all the failure flags 41 of the items concerning the drive #4, as tabulated in the address translation table 37 of FIG. 3. If the P-drive number 42 storing the parity information fails, all the failure flags 41 corresponding to the data used for generating the parity information is set to "1" so that all the failure flags 41 of the data #5, #6, #7 and #8 having the parity information stored in the drive #4 are set to "1".

The failure flag is set, as described above, so that the data writing/reading operations for the failed drive can be continued by the method already described. On the other hand, the failed drive has to be replaced by a normal one, the operator replaces or repairs the failed drive by a normal one or changes it into a preparatory drive, if prepared. After the replacement of the failure drive by the normal one restoration is required to restore the data of the failure drive from the data of another drive. This restoration is executed at the unit of parity group. The parity group is restored in the order based upon the reliability and the performance at the failure time, as will be described in detail in the following.

As shown in FIGS. 2 and 6, in the drives 14 composing the logical group 15, there exist: the parity group PG#1 having four data and one parity (4D+1P); the parity group PG#2 having three data and one parity (3D+1P); the duplex parity group PG#3; and the parity group PG#4 or the unit drive. The DADR1 and DADR2 are the in-SCSI addresses of the parity group PG#1 of (4D+1P); the DADR3 and DADR4 are the in-SCSI addresses of the parity group PG#2 of (3D+1P); the DADR5, DADR6 and DADR7 are the in-SCSI addresses of the duplex parity group PG#3; and the DADR8 is the in-SCSI address of the parity group PG#4 or the unit drive. Since the parity group PG#4 has a reliability equivalent to that of the unit drive, the data are lost if a failure occurs in the drive #1 storing the parity group PG#4. The three kinds of parity groups 17 excepting the PG#4 are arranged in the order of duplex, 3D+1P, and 4D+1P according to the higher reliability and the higher performance at the time of a failure. Specifically, in the parity group PG#1 of (4D+1P) containing the DADR1 and DADR2, the data are lost if a failure occurs at the first drive 14 and if a failure occurs at another arbitrary drive 14 in the logical group 15 before the restoration of the first drive. In the parity group PG#2 of (3D+1P) containing the DADR2 and DADR3, on the other hand, even if a failure occurs at the first drive 14 and if a failure occurs at another drive 14 in the logical group 15 before the restoration of the first drive 14, the data are not lost unless the drive stores the data composing the parity group PG#2. As the duplex parity group PG#3, the data are not lost unless failures occur at a pair of duplex drives 14.

According to the construction of the parity group 17, as described above, the percentage of data disappearance is different due to a failure at the second drive 14. This percentage is exhibited in the reliability 29 of the logical group component table 18. In other words, the parity group having a larger value of the reliability 29 (i.e., a lower reliability) is liable to have a failure at the second drive so that the percentage of data disappearance is higher. Moreover, this classification can also be applied even when the performance is lowered at the time of a failure, as will be described in the following. In case a writing or reading demand occurs to the failed drive 14, as described, the reading demand has to be issued to the four drives 14 of (4D+1P). For the (3D+1P) however, the reading demand may be issued to the three drives 14. For the duplex, the reading demand may be issued to only one drive. In case the reading demand or the writing demand thus occurs to the failed drive 14, the number of drives, to which the reading demand has to be issued, is lowered in the order of (4D+1P), (3D+1P) and the duplex so that the performance at the failure time is raised in the same order.

Therefore, in case the first drive 14 fails so that the data in the failure drive 14 are to be restored, this restoration is executed from the parity group 17 having a lower reliability and a lower performance at the failure time (i.e., a higher percentage of data appearance, (i.e., the data disappearance percentage) in case the second drive fails). Specifically, with reference to the reliability 29 of the logical group component table 18, the restoration is executed sequentially from the parity group having a higher value of the reliability 29 (i.e., a lower reliability).

Here will be specifically described an example of restoring the parity groups in the order based upon the reliability 29. A failure occurs at the drive #4 in FIGS. 3 and 6. First of all, this failed drive #4 is replaced by a normal drive. The drive 14 is replaced by a preparatory drive 14, if prepared in advance. At this time, the capacities and number of drives 14 are arbitrary after replacement.

In case the capacity of the drive 14 after replacement is different from that of the drive 14 before replacement, the data are restored after the reconstruction of the parity groups in the logical group. In case the drive 14 before replacement has a smaller capacity than that of the drive 14 before replacement, the restoration is executed sequentially from the parity group 17 having a lower reliability (i.e., a higher percentage of data appearance (i.e., the data disappearance percentage) in case the second drive fails). The data relating to the area, in which the drive 14 after replacement is short, are restored by the space area in the logical volume 15. Specifically, the position of the drive #4, in which the in-SCSI address 43 is the DADR1 and DADR2, is stored with the data #4 and the parity of the parity group PG#1, and the position, in which the in-SCSI address 43 is the DADR3 and DADR4, is stored with the data #10 and #13 of the parity group PG#2. The PG#1 is the parity group 17 of (4D+1P), and the PG#2 is the parity group 17 of (3D+1P).

With reference to the logical group component table 18 of FIG. 4, it is found that the failure drive #4 is used in the parity groups PG#1 and PG#2. Of these parity groups PG#1 and PG#2, the parity group PG#1 has a higher value of the reliability 29 and a higher percentage (or the data disappearance percentage) of the data disappearance in the case of failure of the second drive. Therefore, the MP 9 restores at first the data #4 of the parity group PG#1. Specifically, the MP 9 recognizes at first, from the address translation table 37, the D-drive number 40 stored with the data #1, #2 and #3, the P-drive number 42 stored with the parity information generated from those data, the in-SCSI address 43 or the physical address in those drives 14, and the failure flag 41. Next, the MP 9 reads out those data and parity information from the individual drives 14 and store them in the cache memory 8. At this time, of those data and parity information, the MP 9 does not read out the data having their addresses stored in the cache address 39 of the address translation table 37 of FIG. 3, from the drive 14 by deeming that those data already exist in the cache memory 8. The data are exemplified by the data #2 of FIG. 3. The method of reading those data and parity information from the drives 14 and storing them in the cache memory 8 is identical to the reading method from the drives 14 to the cache memory 8, as has been described before. The MP 9 takes an exclusive OR between the data and parity information thus read out by the PG 11, to restore the data #4 stored in the failure drive #4 thereby to store them in the cache memory 8. At this time, the C Adp 10 informs the MP 9 of the fact that the data are to be stored in the cache memory 8. On the basis of this information, the MP 9 registers the cache address 39 of the address translation table 37 with the address in the cache memory 8 stored with the restored data #4 and turns OFF (to 0) the corresponding failure flag 41.

Thus, all the data and parity information of the parity group PG#1 of the failed drive #4 are restored, and the replaced normal drive 14 is stored with the restored data. After all the data of the drive #4 contained in the parity group PG#1 have been restored, the data disappearance percentage is lowered, but the performance at the failure time is improved.

Here is started the restoration of the data belonging to the parity group PG#2 of (3D+1P) of the failure drive #4. This restoration method is similar to that of the aforementioned parity group PG#1 of (5D+1P). Thus, the parity groups PG#1 and PG#2 in the drive #4 are restored, and the drive #4 is restored.

In case the duplex parity group PG#3 is contained in the failed drive, the data belonging to the parity group PG#3 are subsequently restored. In restoring the duplex data, the data stored in the normal one 14 of the duplex drives 14 are read out to the cache memory 8 and are written from the cache memory 8 into the normal drive 14 which has replaced the failed drive. The data are read out from the drive 14 to the cache memory 8 as at the time of the cache miss in the aforementioned reading operation at the normal time.

The data arrangement in the logical group 15 can be freely set without any limitation at the initialization of the user, although it has been described in connection with the data arrangement in the logical group 15 with reference to FIG. 2. At the level 5 of the RAID, moreover, the parity group 17 can be set to (3D+2P) to increase the parity number in the parity group 17, and the parity group 17 can also be set with an improved reliability (i.e., the data disappearance percentage). From the standpoint of the reliability and the performance at the failure time, the restoration is executed from the parity group 17 having a high data disappearance percentage (i.e., 4D+1P, 3D+1P, the duplex).

As a modification, the data having the higher significance are stored in the parity group 17 (having a disappearance percentage rising in the order of the duplex, 3D+1P, and 4D+1P) having the lower disappearance percentage, but the restoration is executed in the order of the parity group 17 having the lower data disappearance percentage (i.e., in the order of the duplex, 3D+1P, and 4D+1P). By this restoring stressing the reliability, it is possible to highly reduce the data disappearance percentage for the remarkably significant data.

The restoration can be freely set in accordance with the circumstances of the user. Moreover, it is possible to freely set the values for the reading and writing demands from the host when the time and start of the restoration are decided. The setting of the restoration method is instructed to the MP 9 at the initialization stage.

Moreover, the present invention can also be used for backup, as described in the following. In case the data written in the drive 14 are significant, the data in the drive 14 are backed up by storing them in the MT (Magnetic Disk) or the optical disk. With this backup, even if the data are lost by a failure at the drive 14 in the disk array, the lost data can be restored from the backup data. Therefore, the time period for this backup is decentralized by the characteristics of the parity group 17. Specifically, the disappearance percentage grows higher in the order of the parity group 17 of the duplex, 3D+1P, and 4D+1P (or the unit drive). Therefore, the parity group 17 having the higher disappearance percentage is the more frequently backed up. As a result, what has to be backed up is the dangerous data having a high data disappearance percentage. As a result, the backup time period can be shortened and decentralized according to the characteristics of the parity group 17.

Like the failure restoration, the data having the higher significant are stored in the parity group 17 having the higher reliability (in which the disappearance percentage rises in the order of the duplex, 3D+1P, 4D+1P (or the unit drive )), and the backup is executed in the parity group 17 having the lower reliability (i.e., in the order of the duplex, 3D+1P, 5D+1P (or the unit drive)). Thus, it is apparent that the backup can also be achieved stressing the reliability.

In case one logical volume is composed of a plurality of parity groups, the MP 9 decides, according to the significance of the data (as given from the CPU 1), whether the data are to be assigned to the parity group having the higher reliability or the lower reliability. However, this decision may be executed at the side of the CPU 1.

By issuing an inquiry from the CPU 1 to the disk array system, for example, the CPU 1 is enabled to know the reliability and transfer rate (i.e., the reliability 29 and the transfer rate 30 of the logical group component table 18 of FIG. 4) of each parity group, to determine the parity group having such reliability and transfer rate as are suitable for the CPU 1 to write the data in accordance with their characteristics (i.e., the significance and size of the data). Moreover, the data may be written by designating the parity groups individually from the CPU 1.

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

We claim:

1. A disk array system, comprising:
a plurality of separate storage units for storing data from a host and storing parity information made from said data;
a control unit connected with said plurality of storage units for controlling access;
at least two of said storage units having different capacities including at least one storage unit of a first capacity and at least one storage unit of greater capacity;
at least one parity group including said one said storage unit of a first capacity and a first portion of the capacity of said storage unit of greater capacity;
at least another parity group including a different portion of the capacity of said storage unit of greater capacity that does not include said first portion; and
wherein said different portion of said another parity group has a capacity that is equal to a difference between the capacity of said one storage unit of a first capacity and a capacity of a storage unit having a next greater capacity.

2. A disk array system as set forth in claim 1, wherein said one parity group includes a storage unit having least capacity of the plurality of storage units.

3. A disk array system as set forth in claim 2, further comprising a stored table set with information on all parity groups and portions of capacity of said storage units that form said parity groups.

4. A disk array system as set forth in claim 3, wherein said parity groups have RAID constructions set independently of the individual parity groups.

5. A disk array system as set forth in claim 4, wherein said table stores information on construction, reliability and transfer rates of the RAID of each of said parity groups.

6. A disk array system as set forth in claim 5, wherein said control unit includes means for storing said data sequentially to a parity group having highest reliability among available parity groups.

7. A disk array system as set forth in claim 4, wherein said control unit includes means for storing said data sequentially to a parity group having highest reliability among available parity groups.

8. A disk array system as set forth in claim 1, further comprising a stored table set with information on all parity groups and portions of capacity of said storage units that form said parity groups.

9. A disk array system as set forth in claim 8, wherein said parity groups have RAID constructions set independently of the individual parity groups.

10. A disk array system as set forth in claim 9, wherein said table stores information on construction, reliability and transfer rates of the RAID of each of said parity groups.

11. A disk array system as set forth in claim 10, further including means responsive to when any of said plurality of storage units fails, for restoring data sequentially from a parity group having lowest reliability.

12. A disk array system as set forth in claim 10, further including one logical volume formed of a plural number of said parity groups; and
means processing an access demand from said host so that said one logical volume is accessible as one virtual volume from said host.

13. A disk array system as set forth in claim 12, wherein said control unit includes means for processing a host demand for writing of data designating a logical volume composed of plural parity groups and designating a logical address in said logical volume, by selecting and writing to a one of the parity groups according to reliability and transfer rate demanded by said write data.

14. A disk array system as set forth in claim 12, wherein one logical volume is composed of one parity group including said plurality of storage units.

15. A disk array system comprising:
a plurality of separate storage units for storing data from a host and storing parity information made from said data;

a control unit connected with said plurality of storage units for controlling access;

at least two of said storage units having different capacities including at least one storage unit of a first capacity and at least one storage unit of greater capacity;

at least one parity group including said one said storage unit of a first capacity and a first portion of the capacity of said storage unit of greater capacity;

at least another parity group including a different portion of the capacity of said storage unit of greater capacity that does not include said first portion;

further comprising a stored table set with information on all parity groups and portions of capacity of said storage units that form said parity groups;

wherein said parity groups have RAID constructions set independently of the individual parity groups;

wherein said table stores information on construction, reliability and transfer rates of the RAID of each of said parity groups;

further including one logical volume formed of a plural number of said parity groups;

means processing an access demand from said host so that said one logical volume is accessible as one virtual volume from said host;

wherein one logical volume is composed of one parity group including said plurality of storage units; and wherein said control unit includes means for informing said host in advance of said access demand the reliability and transfer rates of the parity groups composing said logical volume, so that when the access is demanded from said host, the parity group and the logical address in said parity group are designated to select a parity group conforming to the reliability and transfer rate demanded by the data.

16. A disk array system comprising:

a plurality of storage units, at least two of which have different capacities;

a control unit for controlling access to said plurality of storage units;

means for setting a first parity group of equal storage areas in different ones of said storage units with the storage areas each equal in capacity to the capacity of one of said plurality of storage units that has the least capacity, and for setting a second parity group of different equal storage areas from at least some of said plurality of storage units including at least one of the storage units of the first parity group;

a memory storing construction information indicating an area of a corresponding said storage unit from which each of said parity groups are constructed and construction information of a RAID of each parity group as a logical group component table;

means for making and a memory for storing an address translation table to translate a logical address designated, when access is demanded from a host, into a physical address of a storage unit on a basis of the construction information of said logical group component table; and means for determining the physical address of said storage unit corresponding to said logical address with reference to said address translation table, when access designating said logical address is demanded from said host, to access said physical address;

wherein said different equal storage areas of said second parity group are equal to a difference between a capacity of said one storage unit of least capacity and a capacity of a storage unit having a next greater capacity.

17. A method of initializing a disk array system including a plurality of storage units, at least two of which have different capacities, and a control unit for controlling access to the plurality of storage units, comprising the steps of:

acquiring the capacities of said storage units;

setting a first parity group by assigning areas of said capacities from a plurality of said storage units so that each area is equal in capacity to a memory capacity of one of said storage units that has least capacity of all said storage units;

setting at least a second parity group by assigning equal storage areas, which areas are other than the areas set with said first parity group and are from at least one storage unit of said first parity group; and wherein said equal storage areas of said second parity group have a capacity that is equal to a difference between the capacity of said one storage unit having the least capacity and a capacity of a storage unit having a next greater capacity.

18. A disk array system as set forth in claim 17, further including making a logical group component table storing construction information indicating what areas of what storage units the parity groups are set and construction information of a RAID of each parity group.

19. A disk array system as set forth in claim 18, further including making an address translation table for translating a logical address designated when access is demanded from a host, into a physical address of one of said storage units.

20. A disk array system as set forth in claim 17, further including making an address translation table for translating a logical address designated when access is demanded from a host, into a physical address of one of said storage units.

* * * * *